(12) United States Patent  
Orozco et al.

(10) Patent No.: US 6,749,208 B2  
(45) Date of Patent: Jun. 15, 2004

(54) NESTABLE PLATTER CART

(75) Inventors: Miguel J. Orozco, Lakewood, CA (US); V. John Ondrasik, Commerce, CA (US)

(73) Assignee: Precision Wire Racks and Carts, Inc., Commerce, CA (US)

(*) Notice: Subject to any disclaimer, the term of this patent is extended or adjusted under 35 U.S.C. 154(b) by 0 days.

(21) Appl. No.: 10/139,694

(22) Filed: May 3, 2002

(65) Prior Publication Data

US 2003/0205876 A1 Nov. 6, 2003

(51) Int. Cl.[7] ................................................ B62B 5/00
(52) U.S. Cl. ................. 280/79.3; 280/47.35; 211/126.1
(58) Field of Search ....................... 280/79.3, 79.11, 280/79.6, 79.7, 47.35, 47.28, 33.991, 33.992, 33.998, 33.997, 638, 639, 645; 211/133.1, 194, 193, 126.1

(56) References Cited

U.S. PATENT DOCUMENTS

| | | | |
|---|---|---|---|
| 2,928,681 A | 3/1960 | Wilson | |
| 2,982,422 A | 5/1961 | Asproyerakas | |
| 2,992,010 A | 7/1961 | Sides | |
| 3,212,648 A * | 10/1965 | Baker, Jr. et al. | 211/193 |
| 3,272,528 A | 9/1966 | Young et al. | |
| 3,512,654 A * | 5/1970 | Olsen et al. | 211/193 |
| 3,527,360 A * | 9/1970 | Thielking | 211/150 |
| 3,554,477 A * | 1/1971 | D'Altrui | 211/193 |
| 3,920,258 A | 11/1975 | Lundstrom et al. | |
| 4,004,819 A | 1/1977 | Brongo | |
| 4,286,719 A * | 9/1981 | Hall | 211/193 |
| 4,397,432 A * | 8/1983 | Resetar | 211/193 |
| 4,519,512 A * | 5/1985 | Frazier et al. | 211/193 |
| 4,627,542 A | 12/1986 | Fredrickson | |
| 5,125,520 A * | 6/1992 | Kawasaki | 211/133.1 |
| 5,538,145 A * | 7/1996 | Held | 211/41.2 |
| 6,203,035 B1 | 3/2001 | Ondrasik | |

* cited by examiner

Primary Examiner—Brian L. Johnson  
Assistant Examiner—Hau Phan  
(74) Attorney, Agent, or Firm—Gordon & Rees LLP

(57) ABSTRACT

A platter cart has a wheeled base and at least one vertical support extending upwardly from each side of the base at a location spaced between the front and rear end of the base. A series of front shelves are secured to extend forwardly from the supports at spaced intervals, and a series of horizontal rear shelves are secured to extend rearwardly from the supports at spaced intervals. Each rear shelf is vertically offset from the front shelves, so that two platter carts can be nested together by pushing a rearward cart into the end of a front cart with the front shelves of the rearward cart nesting into the spaces between the rear shelves of the front cart.

9 Claims, 4 Drawing Sheets

NESTABLE PLATTER CART

BACKGROUND OF THE INVENTION

The present invention relates generally to wheeled platter carts or tray carrying racks for transporting commodities from one location to another, for example from a storage area or freezer to customer accessible shelving in a grocery store or the like. It is particularly concerned with a platter cart which is nestable with other such carts for reducing storage space requirements when the carts are not in use.

Conventional platter carts are large and have a generally square or rectangular support frame extending upwardly from caster wheels at the lower end of the frame, and a plurality of spaced horizontal shelves secured along the height of the frame. Traditional platter carts are not capable of nesting, and several such carts will take up a considerable amount of storage space when not in use.

Some nestable platter carts have been proposed in the past. U.S. Pat. No. 6,203,035 of Ondrasik describes a platter cart with a plurality of W-shaped support shelves and a tapered base opening rearwardly, such that the base and support shelves of two or more carts can be interfitted to nest together for storage. However, this requires each shelf to be of open configuration apart from the W-shaped support, and can therefore only be used for supporting items on trays or platters which are placed on the shelf. U.S. Pat. No. 3,272,528 of Young et al. describes a platter cart with shelves which may be tilted upwardly to allow the carts to be nested when not in use.

SUMMARY OF THE INVENTION

It is an object of the present invention to provide a new and improved platter cart which can be nested with other identical carts either for storage when not in use, or for transporting a plurality of loaded carts simultaneously.

According to the present invention, a platter cart is provided, which comprises an upwardly extending support frame having a base, caster wheels secured at the base, opposite sides extending upwardly from the base, an upper end, a rear end, and a forward end, and a plurality of spaced, generally horizontal shelves secured between the opposite sides of the frame, the shelves comprising a series of spaced forward shelf parts extending forwardly from the sides of the frame and a series of spaced rearward shelf parts extending rearwardly from the sides of the frame, the forward shelf parts being offset at a different height from all of the rearward shelf parts, such that two carts may be nested together by interfitting the forward shelf parts of a rearward cart in the spaces between the rearward shelf parts of a forward cart.

Each pair of adjacent forward and rearward shelf parts may have an integral outer frame with opposite sides which have a tapered or inclined portion forming a connection between the offset horizontal forward and rearward shelf part. Alternatively, completely separate sets of forward and rearward shelves may be provided, which are each secured to the opposite sides of the frame. Each shelf or shelf part may have an outer peripheral frame having opposite sides and a plurality of cross bars extending between the opposite sides of the frame in order to support items or platters or trays supporting items to be stocked on store shelves, such as bakery, meat products, dairy products or the like. The base may be generally U-shaped, with a rear end opening and inwardly tapered sides extending up to the front end of the cart, to allow the base of another cart to be nested in from the rear.

According to an exemplary embodiment of the invention, the upwardly extending support frame comprises at least two parallel, vertical support rods extending upwardly from opposite sides of the frame at an intermediate position on the base between the front and rear of the cart. The shelves or shelf parts may be secured to the sides at spaced intervals along the height of the frame. The vertical support rods may be secured together at their upper ends. In the exemplary embodiment, the vertical support rods are located approximately at the center of the frame, and there may be two sets of parallel support rods for added support. The shelves or shelf parts are each secured to the support rods and are otherwise free and unsupported at their front and rear ends, with open spaces or gaps between the shelves, such that carts can be readily nested together with the front shelves or shelf parts of the rearmost cart interleaved with the rear shelf portions or parts of the front cart. It will be understood that a similar nesting arrangement may be provided with front shelf portions which are raised above the height of the rear shelf portions or parts.

The platter cart of this invention is of simple construction and provides a significant amount of shelf space for carrying items separately or on trays or platters, while still permitting two or more carts to be readily nested together when not in use, conserving space. Because of the offset between the shelves when the carts are nested, they can be nested together while the shelves are loaded with product. This allows one individual to transport a member of loaded carts simultaneously.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which.

DETAILED DESCRIPTION OF THE DRAWINGS

Figure 1:
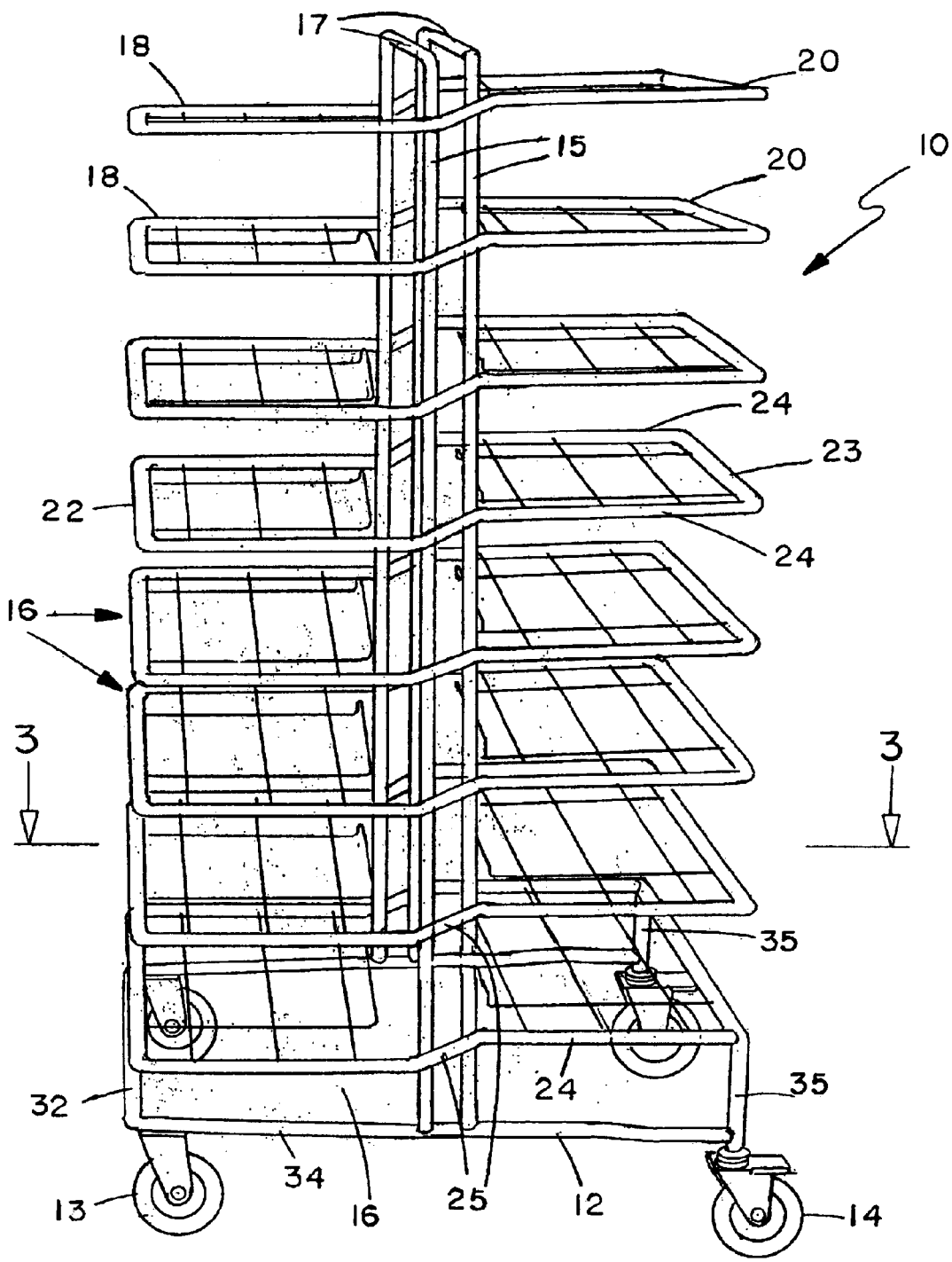
FIG. 1 is a perspective view of the platter cart according to a first embodiment of the invention.

FIGS. 1 to 5 illustrate a platter cart 10 according to a first embodiment of the present invention. The cart 10 basically comprises a support frame having a wheeled base 12 with front and rear caster wheels 13,14, and a pair of upright supports 15 extending upwardly from the opposite sides of the base 12 at an intermediate position between the front and rear of the frame. Each upright support 15 has a vertical strut extending upwardly from each side of the frame, and a cross bar 17 connecting the struts at the upper end of the frame. A plurality of spaced, generally horizontal shelves 16 are secured to the upright supports at spaced intervals along the height of the frame.

Figure 2:
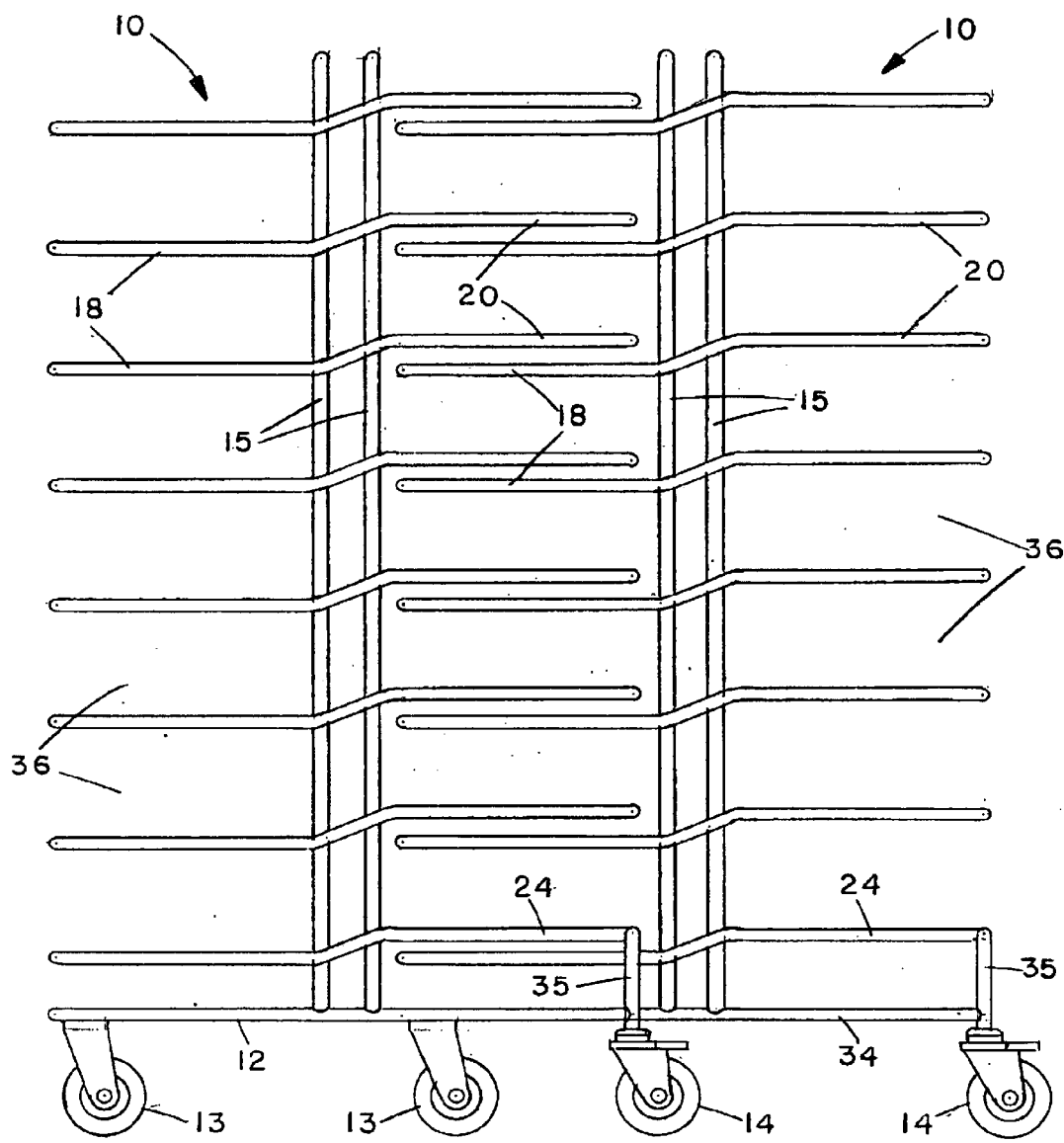
FIG. 2 is a side view showing two carts nested.

Each shelf has a front part 18 at one height and a stepped rear part 20 at a different height from the front part, such that all of the rear shelf parts 20 are at different heights from the front parts 18, as best illustrated in FIG. 2. In the illustrated embodiment, each shelf front part is lower than the shelf rear part, although this may be reversed in other embodiments, with the rear part being lower than the front part. The front and rear part of each shelf is formed with an integral peripheral frame of generally rectangular shape, each frame having a front end 22, a rear end 23, and opposite sides 24, with each side having a downwardly inclined portion 25 connecting the higher rear part of the shelf to the lower front part of the shelf.

Figure 3:
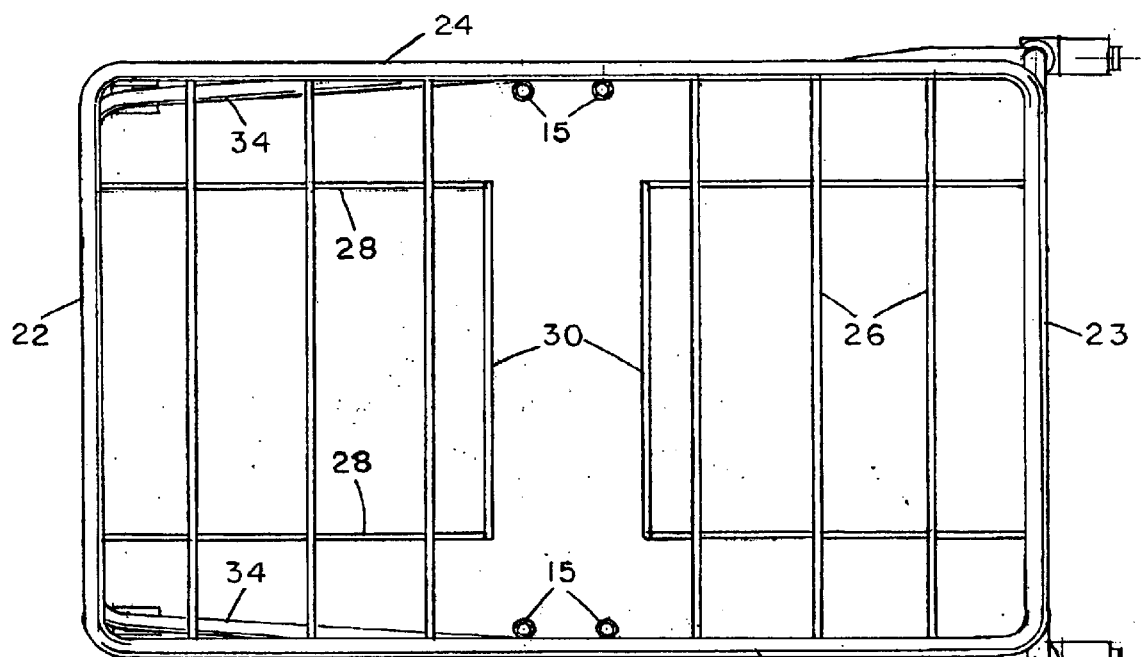
FIG. 3 is an enlarged sectional view taken on line 3—3 of FIG. 1.
Figure 4:
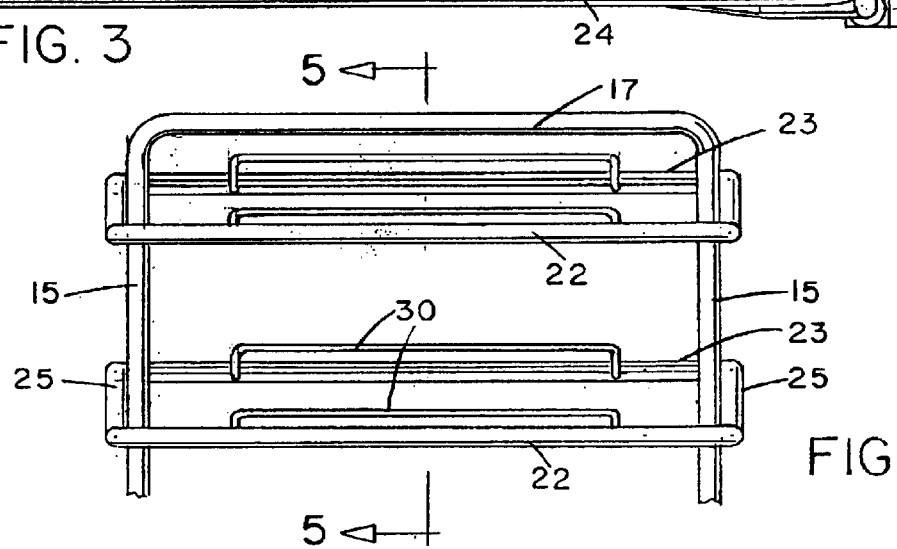
FIG. 4 is a left hand end view of the upper portion of the cart.
Figure 5:
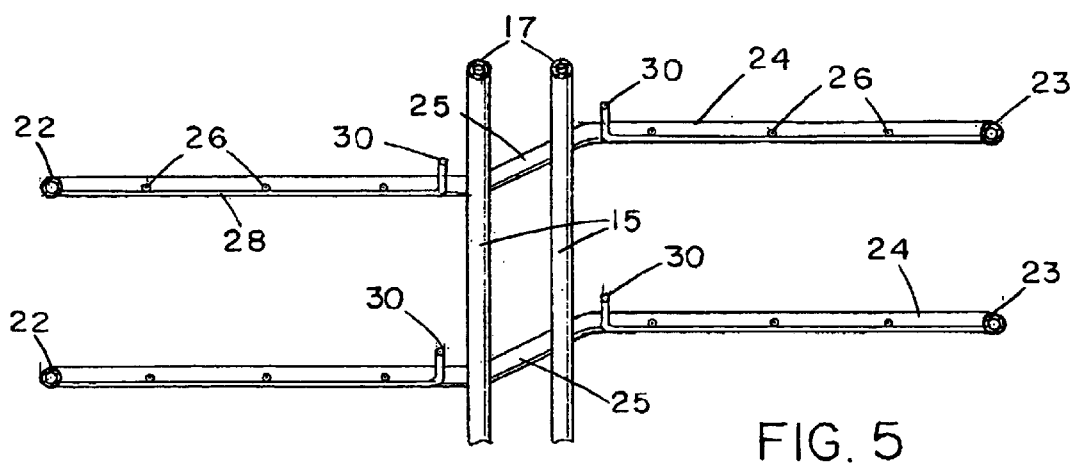
FIG. 5 is a sectional view taken on line 5—5 of FIG. 4.

A series of spaced, parallel cross bars or wires 26 extend between the opposite sides 24 of the shelf peripheral frame in the front and rear part of each shelf, with the region between the tapered side portions 25 being empty, as best illustrated in FIGS. 1 and 3. The tapered side portions 25 are suitably welded to the outside faces of the vertical struts, as indicated in FIG. 3. Each shelf part also has a generally U-shaped cross wire member welded across the wires 26, with ends secured to the respective front and rear ends of the peripheral frame and legs 28 extending across bars 26 to the inner end of the shelf part, as illustrated in FIG. 3. Each U-shaped cross bar has a raised, hook-like inner end 30 forming an end stop or raised ledge for trays, platters and the like placed on the shelf part, as best illustrated in FIGS. 4 and 5.

The base 12 of the cart comprises a generally U-shaped rod or bar having a straight forward end 32 and opposite sides 34 which taper slightly outwardly from the forward end to the rear of the cart, with an open rear end to permit nesting of carts. The lowermost shelf 16 is secured to the base at its rear end via vertical support posts 35 extending upwardly from the rear end of the base to the rear end 23 of the shelf 16 at its corners, as illustrated in FIGS. 1 and 2. This provides added support and strength at the base of the cart. The remainder of the shelves are free at their forward and rear ends, leaving spaces 36 between each adjacent pair of front or rear shelf parts, as best seen in FIG. 2.

Two or more platter carts 10 can be readily nested together in the manner illustrated in FIG. 2. The front end of a rear cart can be pushed into the rear end of a front cart 10, with the base 12 of the rear cart entering the open rear end of the base of the front cart, and each of the front shelf parts 18 nesting into the gaps or spaces 36 between the rear shelf parts 20 of the front cart, such that the shelves of the two carts are interleaved. This reduces the storage space required for two such platter carts by approximately 50%. If desired, a handle may be provided between the rear ends of two of the rear shelf parts at an appropriate height, for ease in transporting the cart. Also, because of the offset between the shelves when the carts are nested, they can be nested together while the shelves are loaded with product. This allows one individual to transport a member of loaded carts simultaneously.

Figure 7:
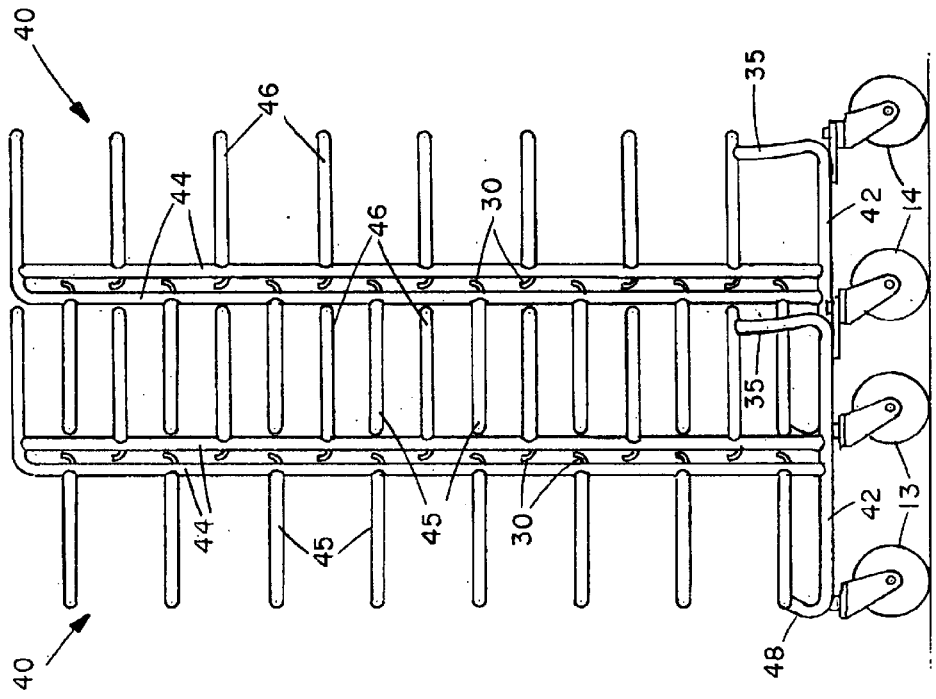
FIG. 7 is a side view of two carts according to FIG. 6 in the nested position.
Figure 6:
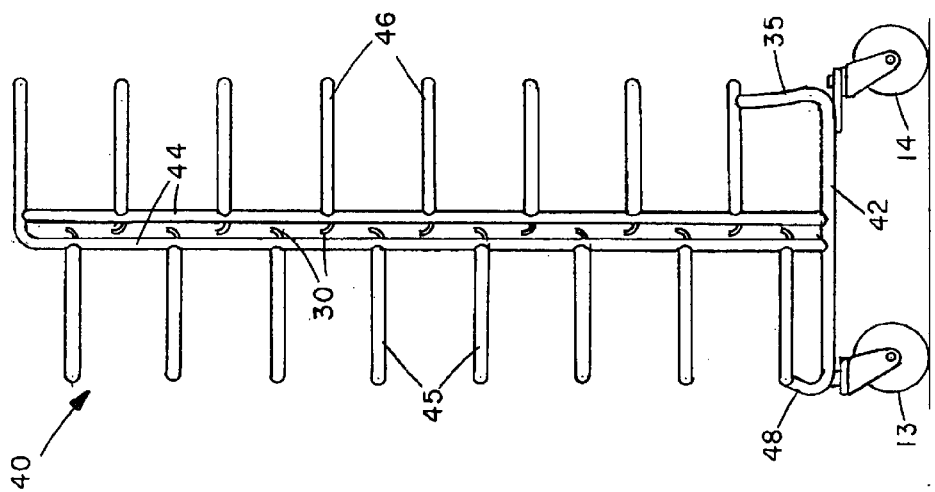
FIG. 6 is a side view of a cart with an alternative shelf configuration.

FIG. 6 of the drawings illustrates a modified platter cart 40 with an alternative shelf configuration, while FIG. 7 illustrates two carts 40 nested together. In this embodiment, the cart 40 has a wheeled base 42 with caster wheels 13,14 as in the previous embodiment, and an upright support frame 44 extending upwardly from the base on both sides of the cart at a location spaced between the front and rear ends of the cart. The vertical support frame 44 is suitably located approximately at the center of the cart. A first set of spaced front shelves 45 extend forwardly at spaced intervals from the frame 44, while a second set of spaced rear shelves 46 extend rearwardly at spaced intervals from frame 44, each of the rear shelves being offset in height from the front shelves. As in the previous embodiment, each shelf 45, 46 has an end stop or ledge 30 extending across its inner end for locating the inner edge of a tray or platter placed on the shelf.

The lowermost rear shelf 46 is secured to the rear end of the base by posts 35 on each side, as in the previous embodiment. The lowermost front shelf 45 is also secured to the front end of the base via connecting posts 48 for added support. Each individual shelf will be of similar construction to the shelf portions 18 and 20 of FIGS. 1 to 5, with the main difference being the fact that the front and rear shelves are completely separate and not joined together with an integral peripheral frame. Instead, the rear ends of each front shelf 45 are welded to the front uprights of the vertical support frame, while the front or inner ends of each rear shelf 46 are welded to the rear uprights of the vertical support frame.

Carts 40 may be nested together in a similar manner to the previous embodiment, as indicated in FIG. 7, simply by pushing a rear cart into the rear end of a forward cart. The bases will nest together, and each front shelf 45 of the rear cart will nest into the space between a respective pair of rear shelves 46 of the front cart. This allows a number of platter carts to be nested together quickly and easily for storage purposes, or for transporting several loaded carts simultaneously.

The platter cart of the above embodiments has sufficient shelf space for securely transporting a large amount of goods either placed directly on the shelves, or on trays or platters placed onto the shelves. At the same time, it can be readily nested together with other such carts when not in use, significantly reducing storage space required for such carts. A row of nested platter carts can be easily pushed as a unit from one location to another, if required. The cart is of simple and inexpensive construction, while permitting easy nesting and separation of carts as required.

Although some exemplary embodiments of the invention have been described above by way of example only, it will be understood by those skilled in the field that modifications may be made to the disclosed embodiments without departing from the scope of the invention, which is defined by the appended claims.

We claim:

1. A platter cart, comprising:
   an upwardly extending support frame having a base, caster wheels secured at the base, an upper end, a rear end, and a forward end, and opposite sides extending upwardly from the base at a location spaced between the ends of the frame;
   a plurality of spaced, generally horizontal shelves rigidly secured between the opposite sides of the frame, the shelves comprising a series of spaced, horizontal forward shelf parts extending forwardly from the sides of the frame and a series of spaced, horizontal rearward shelf parts extending rearwardly from the sides of the frame;
   the forward shelf parts being permanently offset at a different height from all of the rearward shelf parts, such that two carts are nested together by interfitting the horizontal forward shelf parts of a rearward cart in the spaces between the horizontal rearward shelf parts of a forward cart.

2. The apparatus as claimed in claim 1, wherein each shelf has an integral peripheral frame extending around the forward and rearward shelf part, the peripheral frame having a front end, a rear end, and opposite sides, and each side having an inclined portion extending between the offset forward and rearward shelf part.

3. The apparatus as claimed in claim 1, wherein each shelf part has an outer peripheral frame having opposite sides and a plurality of cross bars extending between the opposite sides of the frame.

4. The apparatus as claimed in claim 1, wherein each shelf part has an inner end adjacent the sides of the frame, and an upwardly extending ledge at the inner end of each shelf part to form an end stop for a tray placed on the shelf part.

5. The apparatus as claimed in claim 1, wherein the base is generally U-shaped, having a forward end, an open rear end, and opposite sides tapering outwardly from the forward end of the base to the open rear end.

6. The apparatus as claimed in claim 1, wherein the sides of the frame comprise at least two parallel, vertical support rods extending upwardly from each side of the frame.

7. A platter cart, comprising:

an upwardly extending support frame having a base, caster wheels secured at the base, an upper end, a rear end, and a forward end, and opposite sides extending upwardly from the base at a location spaced between the ends of the frame;

a plurality of spaced, generally horizontal shelves secured between the opposite sides of the frame, the shelves comprising a series of spaced forward shelf parts extending forwardly from the sides of the frame and a series of spaced rearward shelf parts extending rearwardly from the sides of the frame;

the forward shelf parts being offset at a different height from all of the rearward shelf parts, such that two carts are nested together by interfitting the forward shelf parts of a rearward cart in the spaces between the rearward shelf parts of a forward cart; and the forward and rear shelf parts being formed separately, each shelf part having an inner end secured to the sides of the frame.

8. A platter cart, comprising:

a wheeled base having a plurality of caster wheels, the base having a front end, a rear end, and opposite sides;

at least one vertical support extending upwardly from each side of the base at a location spaced between the front and rear end of the base and aligned with the support on the opposite side of the base;

a series of horizontal front shelves secured to the supports at spaced intervals and extending forwardly from the supports; and a series of horizontal rear shelves secured to the supports at spaced intervals, each rear shelf being vertically offset from the front shelves;

whereby two platter carts can be nested together by pushing a rearward cart into the end of a front cart with the front shelves of the rearward cart nesting into spaces between the rear shelves of the front cart.

9. A platter cart, comprising:

an upwardly extending support frame having a base, caster wheels secured at the base, an upper end, a rear end, and a forward end, and opposite sides extending upwardly from the base at a location spaced between the ends of the frame;

a plurality of spaced, generally horizontal shelves rigidly secured between the opposite sides of the frame, the shelves comprising a series of spaced, forward shelf parts extending forwardly from the sides of the frame up to a forward end of the shelf part and a series of spaced, rearward shelf parts extending rearwardly from the sides of the frame up to a rearward end of the shelf part, each front and rear shelf part shelf part being attached to the frame only at the opposite sides of the frame and being free and unsupported at the forward and rear end, respectively, of the respective shelf part; and the forward shelf parts being permanently offset at a different height from all of the rearward shelf parts, such that two carts are nested together by interfitting the forward shelf parts of a rearward cart in the spaces between the rearward shelf parts of a forward cart.

* * * * *